(12) United States Patent
Conzelmann

(10) Patent No.: US 8,757,503 B2
(45) Date of Patent: Jun. 24, 2014

(54) METHOD FOR VERIFYING A TIME-SENSITIVE AND/OR TEMPERATURE-SENSITIVE INDICATOR

(75) Inventor: Dieter Conzelmann, Albstadt (DE)

(73) Assignee: Bizerba GmbH & Co. KG, Balingen (DE)

( * ) Notice: Subject to any disclaimer, the term of this patent is extended or adjusted under 35 U.S.C. 154(b) by 1550 days.

(21) Appl. No.: 12/374,645

(22) PCT Filed: May 23, 2007

(86) PCT No.: PCT/EP2007/004595
§ 371 (c)(1),
(2), (4) Date: Nov. 18, 2009

(87) PCT Pub. No.: WO2008/011932
PCT Pub. Date: Jan. 31, 2008

(65) Prior Publication Data
US 2010/0051707 A1    Mar. 4, 2010

(30) Foreign Application Priority Data

Jul. 27, 2006 (DE) .......................... 10 2006 034 810

(51) Int. Cl.
*G06K 19/00* (2006.01)
*G06K 19/06* (2006.01)
*G01K 1/00* (2006.01)
*G01K 1/02* (2006.01)

(52) U.S. Cl.
USPC .......... 235/494; 235/487; 702/130; 702/187; 116/216; 374/102

(58) Field of Classification Search
USPC .......... 235/487, 494; 116/207, 216; 702/130, 702/187–188; 374/102; 340/588–589
See application file for complete search history.

(56) References Cited

U.S. PATENT DOCUMENTS

| 4,737,463 A * | 4/1988 | Bhattacharjee et al. .......... 436/2 |
| 6,544,925 B1 * | 4/2003 | Prusik et al. .................. 503/201 |
| 6,884,394 B1 | 4/2005 | Hehenberger et al. |

(Continued)

FOREIGN PATENT DOCUMENTS

| DE | 27 06 741 A1 | 2/1977 |
| DE | 198 03 208 C2 | 1/1998 |

(Continued)

OTHER PUBLICATIONS

Japanese Office Action, with English Translation, mailed on Feb. 23, 2012 for Japanese Patent Application No. 2009-52117, 7 pages.
Japanese Office Action mailed on Oct. 23, 2012 for JP Patent Application No. 2009-521117, with English Translation, 7 pages.

*Primary Examiner* — Michael G Lee
*Assistant Examiner* — Laura Gudorf
(74) *Attorney, Agent, or Firm* — Kilpatrick Townsend & Stockton LLP

(57) ABSTRACT

The invention relates to a method for verifying a time-sensitive and/or temperature-sensitive indicator for marking perishable products. According to said method, the time at which the indicator is activated is detected and stored, the time difference between the stored activation time and a verification time is determined, and verification is made as to whether the change of the indicator occurring during the determined time difference exceeds or falls short of a desired value that depends on the determined time difference. The invention further relates to an indicator for carrying out such a method.

42 Claims, 2 Drawing Sheets

(56) References Cited

U.S. PATENT DOCUMENTS

Figure 1:
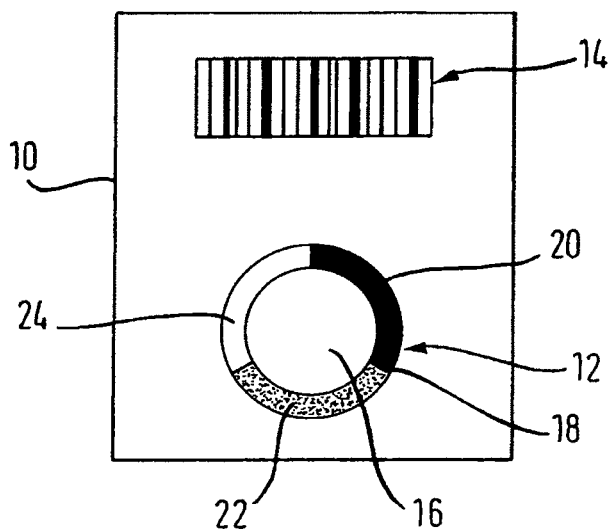

| | | | |
|---|---|---|---|
| 7,081,364 B1 | 7/2006 | Haarer et al. | |
| 2004/0054506 A1* | 3/2004 | Singh et al. | 702/188 |
| 2005/0079257 A1* | 4/2005 | Neto | 426/383 |
| 2005/0248455 A1* | 11/2005 | Pope et al. | 340/539.27 |
| 2006/0145863 A1* | 7/2006 | Martin et al. | 340/572.8 |
| 2007/0203650 A1* | 8/2007 | Jensen et al. | 702/3 |
| 2007/0285238 A1* | 12/2007 | Batra | 340/572.1 |
| 2008/0173712 A1* | 7/2008 | Nemet et al. | 235/385 |

FOREIGN PATENT DOCUMENTS

| | | |
|---|---|---|
| DE | 10 2004 008 539 A1 | 9/2005 |
| JP | 52-102789 A | 8/1977 |
| JP | 9-113500 A | 5/1997 |
| JP | 2000-131152 A | 5/2000 |
| JP | 2003-121271 A | 4/2003 |
| WO | WO 2005/050192 A1 | 6/2005 |

* cited by examiner

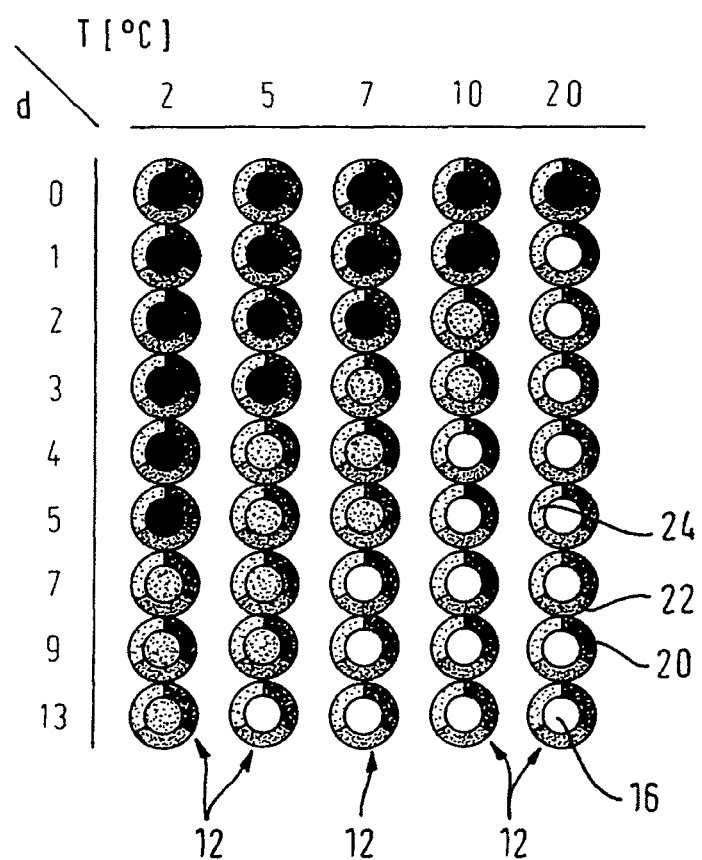

METHOD FOR VERIFYING A TIME-SENSITIVE AND/OR TEMPERATURE-SENSITIVE INDICATOR

CROSS REFERENCE TO RELATED APPLICATIONS

This application is a National Stage of International Application No. PCT/EP2007/004595 filed May 23, 2007 and which claims the benefit of German Patent Application No. 10 2006 034 810.9, the disclosures of all applications being incorporated herein by reference.

The invention relates to a method for checking a time-sensitive and/or temperature-sensitive indicator for the marking of perishable products. The invention furthermore relates to an indicator for the carrying out of such a method.

Time-sensitive and/or temperature sensitive indicators are known from the prior art which can be arranged, for example, on a label, on product packaging or directly on a product and which are suitable to indicate whether a product associated with the indicator has exceeded a preset age and/or whether such a product was stored under sufficiently cool conditions during the time period in which it was provided with the indicator. Indicators are available which are only time-sensitive and are thus independent of temperatures so that they can only identify the age of a product. Furthermore, time-sensitive and temperature-sensitive indicators are known which change both in dependence on the respective time passed and in dependence on the temperature they have respectively been exposed to.

An indicator of the last-named kind is known, for example, from the German patent DE 198 03 208 C2 which relates to a time/temperature indicator which can be coupled to a product and which can be activated by light radiation at any desired time. Such an indicator undergoes a specific discoloration by irradiation with light of a preset irradiation intensity and at a preset wavelength range, whereby it is practically "charged". Provided that no repeat activation takes place, a fading of the indicators takes place subsequently to this activation and its degree is dependent both on the time lapse and on temperature influences.

If it is found at an inspection time that the degree of fading exceeds a preset value, a conclusion can be drawn to the effect that the age of the product is too old and/or that the product was not stored under sufficiently cool conditions, which means that the respective product is not suitable for further use.

Indicators of the named kind can be used sensibly in connection with any kind of perishable products, they are in particular suitable for food products, drugs, stored blood, etc.

The present invention is not restricted to indicators whose function is based on discoloration or fading; the invention is rather applicable to any kind of time-sensitive and/or temperature-sensitive indicators, for example also to such indicators which output a time-dependent and/or temperature-dependent electrical or electromagnetic signal. In the sense of the present invention, "change of an indicator" therefore always means a change of any kind, in particular, however, a discoloration or fading. It is furthermore not absolutely necessary that the indicators described in this application can be activated by means of light rays. Other kinds of sensible activation forms are likewise conceivable in dependence on the respectively used indicator.

On the use of indicators of the described kind, it must be ensured, on the one hand, that the indicators used also actually work. On the other hand, it is desirable to be able to check at any desired time whether a product marked by an indicator has exceeded a preset age or has undergone sufficient cooling. Such a check should in particular already be possible before that time at which the indicator indicates that the product is no longer suitable for further use.

It is an object of the invention to provide a method as well as an indicator with which the functional capability and/or the change of the indicator can be checked in an efficient and reliable manner.

The object is satisfied by a first variant of a method in accordance with the invention for the checking of a time-sensitive and/or temperature-sensitive indicator for the marking of perishable products, wherein the time of the activation of the indicator is detected and stored;

the time difference between the stored activation time and an inspection time is determined; and a check is made whether the change of the indicator which occurred in the determined time difference is greater or less than a desired value dependent on the determined time difference.

Since, in accordance with the invention, the associated activation time of the respective indicator is therefore also always available at any desired inspection time, it becomes possible to check an indicator in a very differentiated manner so that, when the invention is used, such checks are no longer restricted only to determining whether a product is suitable for further use or not.

If, for example, a product is present with an indicator which has a state which is present directly after activation, it was previously necessary to assume that the activation had just taken place. If, however, as becomes possible by the invention, the activation time of the indicator is additionally available, it can e.g. be determined if the functional capability of the indicator is not given. Such a lack of functional capability is, for example, present when the indicator still has its state which is normally only present directly after activation, even though a significant time period has already passed. In accordance with the invention, products having a non-functional indicator can then be ejected from a production process or not be approved for sale.

A corresponding procedure is possible if it is found that the state of the indicator has only changed since its activation to a degree which is too low which does not yet correspond to the time difference between activation and inspection. In accordance with the invention, it can therefore not only be determined whether an indicator generally works, but rather an admittedly given, but not sufficient functionality can also be detected.

Furthermore, it can be determined in accordance with the invention at any desired inspection times whether a product provided with an activated indicator was stored under sufficiently cool conditions up to the inspection time. If such a storage was not given, the indicator namely changes in the time duration between the activation and the check as a result of too high a temperature more strongly than would be permissible in the named time duration so that it becomes possible in accordance with the invention during the total production process to check a product for sufficient cooling and to eject it if necessary.

It is preferred if information is present, for example in the form of a color reference table, at the time of the check as to the manner in which an indicator changes in dependence on the time passed since its activation. With only a time-sensitive indicator, it is sufficient if the functional relationship between the time passed and the change of the indicator which has occurred is known. In contrast, with indicators sensitive both to temperature and to time, it is of advantage if the time-dependent change of the indicator is known for different normally occurring temperatures.

If knowledge of the named kind is present, a check in accordance with the invention can be realized in that it is determined whether the change of the indicator which occurred in the determined time difference between the activation time and the inspection time corresponds to that change which is characteristic for the respective indicator, in particular at a respective preset temperature. If, for example, a temperature of 4° C. must prevail in the production process of a product, a check can be made whether the change after the end of the determined time difference between the activation and the inspection time corresponds to that change which usually occurs at a temperature of 4° C.

If it is then found on such a check that the determined change exceeds the expected change at least by a preset degree, a first error message can be generated which identifies an insufficient cooling and/or too old an age of the product provided with the indicator. Suitable steps, for example an ejection of the respective product, can then be initiated in dependence on this first error message.

If it is, however, found within the framework of the check that the determined change is lower than expected, a second error message can be output which is distinguishable from the first and which marks a lack of functionality or an insufficient functionality of the indicator. Suitable measures can likewise be initiated on the basis of the second error message. In addition to a disqualification of the respective product, they can also comprise a corresponding message taking place to that production facility which provided the product with the indicator since a non-functional or not sufficiently functional indicator was presumably applied to the product there. System errors can be recognized at a time which is as early as possible in each case in this manner.

Different error messages can therefore be output depending on whether the determined change is greater than or less than the change found. The expected value in such a check can naturally be provided with suitable tolerance zones within which no error message is generated.

It is advantageous if a code identifying the activation time is associated with the indicator, with the code, and thus the respective activation time, then being able to be read at the inspection time so that subsequently the time difference between the activation time and the inspection time can be determined. Within the framework of the invention, all those methods will be understood under the association of a code to an indicator by means of which a mechanical coupling can be realized between the code and the indicator, for example as an overprint on a uniform label, on a product or on product packaging.

Alternatively to an association or to a mechanical coupling between a code identifying the activation time and an indicator, it is also possible in accordance with the invention only to associate a code clearly identifying the marked product with the indicator, said code then being stored in a database together with the activation time associated with the respective product. At the inspection time, the code clearly associated with the indicator can then be read so that on the basis of this code the activation time respectively associated with it can be searched in the database. After the reading out of this activation time from the database, the time difference between the activation time and the inspection time can then in turn be determined without problem.

However, for the carrying out of this method alternative, it must be ensured that the database is available for the purpose of writing on the activation of the indicator and for the purpose of reading on the inspection of the indicator. This can be achieved, for example, in that the database is made a component of an internal network or as a database which can be queried over the internet.

It is preferred when the code is applied, in particular overprinted, onto a product to be marked substantially simultaneously with the indicator. The code and the indicator can in this respect be applied by means of a common print procedure or by means of two separate print procedures. If the code and the indicator are then located on a common carrier, for example on a label or on packaging, it is ensured that the code and the indicator cannot subsequently be separated from one another, whereby abuse possibilities are restricted.

It is particularly advantageous if the code additionally contains an identification key of the respective manufacture of the product to be marked. In a possible case of complaint, the responsible manufacture can then also be identified without problem in addition to the date of manufacture corresponding to the activation time. Additionally or alternatively, at least one of the pieces of information named in the following can also be integrated in the code:
type of indicator, indicator-specific operational data and/or sensor data of the application device, product type.

Alternatively or additionally to an identification key of the respective manufacturer or to the information named above, the code can also include a clear identification code marking the respective product. In this case, all products, in particular also those products which do not differ from one another in their type, have different identification codes with respect to which each individual product can be clearly tracked over the total production process and can be identified at any desired times, whereby additional checks are made possible.

The code provided in accordance with the invention can be made as desired and is preferably designed as a miniature barcode or as a data matrix code.

A particularly efficient embodiment of the checks in accordance with the invention is made possible by a sensor which is able to detect both a code and an indicator change since in this case only a single respective reading process has to be carried out by means of the sensor. Alternatively, however, it is also possible to use different sensors for the reading of the code and of the indicator change.

In the reading process, the code and the indicator can be illuminated either actively by the sensor or only by ambient light.

In accordance with a second variant, the invention also relates to a method for the checking of a time-sensitive and/or temperature-sensitive indicator for the marking of perishable products, wherein
 the stored time of the activation of the indicator is called up or read;
 the time difference between the stored activation time and an inspection time is determined; and
 a check is made whether the change of the indicator which occurred in the determined time difference is greater or less than a desired value dependent on the determined time difference.

A method is thus also protected which can, for example, be carried out completely in the region of a cash register system and which only requires that the already stored time of the activation or e.g. the time of activation overprinted on a label is determined in one of the above ways. The detection and storage of the time, which already takes place on the activation of the indicator, does not form part of this method variant in accordance with the invention.

This second method variant can be designed in accordance with all the above-named preferred embodiments of the first variant.

The invention finally also relates to an indicator for the carrying out of methods of the kind described above. Such an indicator is provided with a time-sensitive and/or temperature-sensitive marking which can be activated by means of light and with a code marking an activation time. As already mentioned, the code can additionally include an identification key of a manufacturer and/or an identification code identifying the respective product. The marking and the code of an indicator in accordance with the invention are preferably applied to a common carrier layer.

Further preferred embodiments of the invention are set forth in the dependent claims.

Figure 2:
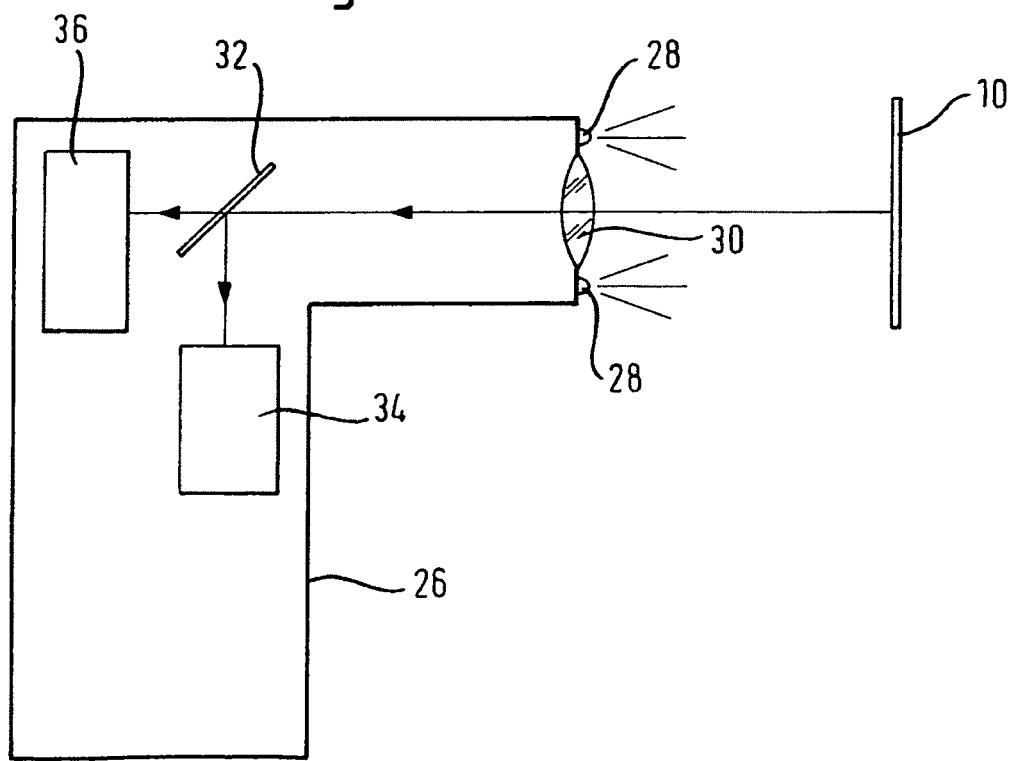

The invention will be explained in the following with reference to an embodiment and to the Figures; there are shown in these:

FIG. 1 a possible embodiment of an indicator in accordance with the invention in a plan view;

FIG. 2 a schematic representation of a sensor for the reading of an indicator in accordance with the invention; and FIG. 3 a matrix representation of discolorations of an indicator in accordance with the invention expected at specific temperatures.

FIG. 1 shows a substantially rectangular label 10 which can be applied to a product and which is provided, in particular printed, in its lower area with a time-sensitive and temperature-sensitive indicator 12 and in its upper area with a barcode 14 containing the activation time of the indicator 12. The indicator 12 and the barcode 14 are arranged spaced apart from one another in the embodiment shown. Alternatively to this, it is also possible to apply an indicator and a code to a label in a mutually overlapping manner. Elements of the code or the total code can in particular also be made as a time-sensitive and/or temperature-sensitive indicator.

The indicator 12 comprises a central, circular area 16 which has a time-sensitive and temperature-sensitive substance, for example a substance in accordance with DE 198 03 208 C2.

The circular area 16 is completely surrounded by a ring-shaped area 18 which is directly adjacent to it and which is divided into three segments 20, 22 and 24 of equal size. The segments 20, 22, 24 in this respect have colors differing from one another. The dark color of the segment 20 corresponds to that color which the circular area 16 has directly after its activation so that the color of this segment 20 ultimately identifies the product state "fresh". The segment 22 has a somewhat lighter color which the circular area 16 has after the end of a specific time period at a specific temperature so that this color identifies a product freshness state "medium". The segment 24, finally, has a comparatively light color which the circular area 16 adopts when, at a preset temperature, such a long time period has passed that the product can no longer be utilized. The color of the segment 24 thus identifies a product state "no longer fresh".

Since the three segments 20, 22, 24 are arranged directly adjacent around the circular area 16, they can ultimately serve as reference colors for an observer with reference to which he can assess by a comparison of the color of the circular area 16 with the colors of the segments 20, 22, 24 which freshness state a product marked by the label 10 has.

FIG. 2 shows in a schematic representation a sensor 26 which is suitable for the reading of a label 10 in accordance with FIG. 1. The sensor 26 has light emitting diodes 28 at its front side which are provided for the illumination of the label 10. It is ensured by such an illumination that both the color of the circular area 16 and the barcode 14 can be reliably detected. Alternatively, the illumination 28 can, however, also be omitted, with in this case it having to be ensured that sufficient ambient light is present on the use of the sensor 26.

An optical receiving system 30 is located between the light emitting diodes 28 and deflects light reflected by the label 10 onto a beam splitter 32. The beam splitter 32 has the effect that some of the received light is deflected toward a first evaluation unit 34 and a further portion of the received light is deflected toward a further evaluation unit 36. The evaluation unit 34 is made as a color change sensor so that it is suitable to detect the color of the circular area 16 in accordance with FIG. 1. The evaluation unit 36, in contrast, is made as a conventional barcode reader so that the activation time contained in the barcode 14 in accordance with FIG. 1 can be read by means of this evaluation unit 36.

Subsequently, the information read can then be evaluated in one of the manners described above within the sensor 26 or also outside the sensor 26 in an external processing unit.

The fact is particularly advantageous that the checks in accordance with the invention can also still be carried out on the sale to the end customer in that, for example, a sensor in accordance with FIG. 2 having a suitable evaluation and display unit is installed, for example, at a cash register.

FIG. 3 shows a matrix in which indicators 12 in accordance with FIG. 1 are shown, with the colors of the circular area 16 of these indicators 12 being shown in dependence on that temperature in ° C. which the circular areas 16 are exposed to and on the age of the indicator 12 in days.

FIG. 3 illustrates accordingly that, for example, an indicator 12 which has been exposed to a temperature of 2° C. for up to five days still has a dark color and thus identifies the product state "fresh". If, however, seven to thirteen days have passed at a temperature of 2° C., the circular area 16 has a somewhat lighter color which then identifies the product freshness state "medium".

If the same indicator 12 is exposed to a temperature of 5° C., it signals the product state "fresh" for only three days; up to the ninth day it shows the state "medium"; on the 13th day, the area 16 has a light color which identifies the product state "no longer fresh".

In an analog manner, the following states apply to temperatures of 7° C., 10° C. and 20° C.:

7° C.:
up to 2 days, fresh; 3 to 5 days, medium; from the 7th day, no longer fresh.

10° C.:
up to day 1, fresh; on the 2nd and 3rd days, medium; from the 4th day, no longer fresh.

20° C.:
directly after activation, fresh; from the 1st day, no longer fresh.

A matrix in accordance with FIG. 3 can be used within the framework of a check in accordance with the invention, in particular by a sensor 26 in accordance with FIG. 2, for example in data form with quantified color values. If in this case e.g. an indicator 12 is checked on the fourth day after its activation and if the product to be checked requires a continuous storage temperature of 7°, it can be seen from the matrix stored in the evaluation unit 26 in accordance with FIG. 3 that the circular area 16 of the indicator 12 has to have the state "medium" on the check. If a corresponding result is achieved within the framework of the check, the checked product can be processed further If the circular area 16, however, has a darker color, a functionality of the indicator is not present or not sufficient (provided the product was stored at 7° C. and not substantially cooler) If the circular area 16, however, has a lighter color, it can be assumed that the checked product was stored at a temperature of above 7° C. at least over a significant time period during the past four days so that a complaint can be made at that company which was responsible for the processing up to the fourth day.

Alternatively to the use of a matrix in accordance with FIG. 3 in data form with quantified color values, the following procedure is also possible in which an evaluation unit practically "calibrates" itself.

Instead of a storage of the expected quantified color values in the evaluation unit taking place in advance, the reference colors 20, 22, 24 surrounding the indicator can additionally be detected on the detection of the color of an indicator by means of a sensor, that is only on the actual check of the state of an indicator. This produces the advantage that possible color shifts which result by a UV filter or a daylight filter are eliminated since these color shifts are adopted in the same manner in the indicator and in the reference colors, provided that the UV filter or daylight filter also covers the reference colors beside the indicator. In addition, it becomes superfluous in most applications to illuminate the indicator actively on the detection of its color since within the framework of the evaluation only relative color differences between the indicator and the reference colors are important. If e.g. as a result of a non-present active illumination the indicator and the reference colors appear somewhat darker, these relative color differences can be determined in an unchanged manner.

A direct comparison can be carried out between the indicator color and the reference colors in the evaluation unit whose result indicates, without the consultation of any absolute values stored in the evaluation unit, whether the product marked by the indicator has the state "fresh", "medium" or "no longer fresh".

Furthermore, it can be stored in the form of a matrix in the evaluation unit after how many days the indicator must show the reference color a (light), b (medium) or c (dark) at a specific temperature without the colors a, b, c being specified with respect to their spectra. Such a specification with reference to the spectrum then takes place only directly on the inspection of the indicator by the determination of the spectrum of its specifically present reference colors—possibly changed by a UV filter or daylight filter. The spectrum of the lightest determined reference color is then associated with the stored reference color a; the spectrum of the medium determined reference color with the stored reference color b; and the spectrum of the darkest determined reference color with the stored reference color c. Subsequently, an evaluation can then take place such as described above with reference to the matrix in accordance with FIG. 3.

REFERENCE NUMERAL LIST 10 label
12 indicator
14 barcode
16 circular area
18 ring-shaped area
20, 22, 24 segment
26 sensor
28 light emitting diodes
30 optical receiving system
32 beam splitter
34 evaluation unit
36 evaluation unit

The invention claimed is:

1. A method for the checking of an indicator having a time-sensitive and/or temperature-sensitive substance activatable via light for the marking of perishable products, wherein
   time of the activation of the indicator is detected and stored;
   time difference between the stored activation time and an inspection time is determined; and
   a check is made whether change of the indicator which occurred in the determined time difference is greater or less than a desired value dependent on the determined time difference.

2. A method in accordance with claim 1, wherein a check is made whether the change of the indicator which has occurred in the determined time difference corresponds to that change which is characteristic for the respective indicator, in particular at a preset temperature.

3. A method in accordance with claim 1, wherein a first error message characterizing an insufficient cooling and/or too old an age of the product provided with the indicator is generated when expected change of the indicator (desired value) is exceeded by at least a preset degree.

4. A method in accordance with claim 1, wherein a second error message marking the functionality of the indicator is generated when expected change of the indicator (desired value) is not reached by at least a preset degree.

5. A method in accordance with claim 1, wherein a code marking the activation time is associated with the indicator;
   further wherein the code, and thus the respective activation time, is read at the inspection time; and
   subsequently wherein the time difference between the activation and inspection is determined,
   with the code in particular still containing at least one of the pieces of information named in the following:
   type of indicator, manufacturer ID, indicator-specific operational data and/or sensor data of an application device, product type.

6. A method in accordance with claim 1, wherein a code clearly identifying a marked product is associated with the indicator and is stored in a database together with the activation time associated with the respective product;
   further wherein the code associated with the indicator is read at the inspection time and the respective activation time is read out of the database via the code; and
   subsequently wherein the time difference between the activation and inspection is determined.

7. A method in accordance with claim 5, wherein the code is applied, in particular overprinted, onto a product to be marked substantially simultaneously with the indicator.

8. A method in accordance with claim 5, wherein the code and the indicator are applied to a common carrier layer.

9. A method in accordance with claim 5, wherein the code contains an identification key of the manufacturer of the product to be marked.

10. A method in accordance with claim 5, wherein the code contains a clear identification code marking the respective product.

11. A method in accordance with claim 5, wherein the code is made as a miniature barcode or as a data matrix code.

12. A method in accordance with claim 5, wherein the code and an indicator change are read with a single sensor.

13. A method in accordance with claim 5, wherein the code and the indicator are illuminated either actively by a sensor or only by ambient light in a reading process.

14. A method in accordance with claim 6, wherein the code is applied, in particular overprinted, onto a product to be marked substantially simultaneously with the indicator.

15. A method in accordance with claim 6, wherein the code and the indicator are applied to a common carrier layer.

16. A method in accordance with claim 6, wherein the code contains an identification key of the manufacturer of the product to be marked.

17. A method in accordance with claim 6, wherein the code contains a clear identification code marking the respective product.

18. A method in accordance with claim 6, wherein the code is made as a miniature barcode or as a data matrix code.

19. A method in accordance with claim 6, wherein the code and an indicator change are read with a single sensor.

20. A method in accordance with claim 6, wherein the code and the indicator are illuminated either actively by a sensor or only by ambient light in the reading process.

21. A method in accordance with claim 1, wherein the indicator having a time-sensitive and/or temperature-sensitive substance activatable via light is a chemical indicator.

22. A method for the checking of an indicator having a time-sensitive and/or temperature-sensitive substance activatable via light for the marking of perishable products, wherein
stored time of activation of the indicator is called up or read;
a time difference between the stored activation time and an inspection time is determined; and
a check is made whether the change of the indicator which occurred in the determined time difference is greater or less than a desired value dependent on the determined time difference.

23. A method in accordance with claim 22, wherein a check is made whether the change of the indicator which has occurred in the determined time difference corresponds to that change which is characteristic for the respective indicator, in particular at a preset temperature.

24. A method in accordance with claim 22, wherein a first error message characterizing an insufficient cooling and/or too old an age of the product provided with the indicator is generated when an expected change of the indicator (desired value) is exceeded by at least a preset degree.

25. A method in accordance with claim 22, wherein a second error message marking the functionality of the indicator is generated when the expected change of the indicator (desired value) is not reached by at least a preset degree.

26. A method in accordance with claim 22, wherein a code marking the activation time is associated with the indicator;
further wherein the code, and thus the respective activation time, is read at the inspection time; and
subsequently wherein the time difference between the activation and inspection is determined,
with the code in particular still containing at least one of the pieces of information named in the following:
type of indicator, manufacturer ID, indicator-specific operational data and/or sensor data of an application device, product type.

27. A method in accordance with claim 22, wherein a code clearly identifying the marked product is associated with the indicator and is stored in a database together with the activation time associated with the respective product;
further wherein the code associated with the indicator is read at the inspection time and the respective activation time is read out of the database via this code; and
subsequently wherein the time difference between the activation point and the inspection point is determined.

28. A method in accordance with claim 26, wherein the code is applied, in particular overprinted, onto a product to be marked substantially simultaneously with the indicator.

29. A method in accordance with claim 26, wherein the code and the indicator are applied to a common carrier layer.

30. A method in accordance with claim 26, wherein the code contains an identification key of the manufacturer of the product to be marked.

31. A method in accordance with claim 26, wherein the code contains a clear identification code marking the respective product.

32. A method in accordance with claim 26, wherein the code is made as a miniature barcode or as a data matrix code.

33. A method in accordance with claim 26, wherein the code and an indicator change are read with a single sensor.

34. A method in accordance with claim 26, wherein the code and the indicator are illuminated either actively by a sensor or only by ambient light in the reading process.

35. A method in accordance with claim 27, wherein the code is applied, in particular overprinted, onto a product to be marked substantially simultaneously with the indicator.

36. A method in accordance with claim 27, wherein the code and the indicator are applied to a common carrier layer.

37. A method in accordance with claim 27, wherein the code contains an identification key of the manufacturer of the product to be marked.

38. A method in accordance with claim 27, wherein the code contains a clear identification code marking the respective product.

39. A method in accordance with claim 27, wherein the code is made as a miniature barcode or as a data matrix code.

40. A method in accordance with claim 27, wherein the code and an indicator change are read with a single sensor.

41. A method in accordance with claim 27, wherein the code and the indicator are illuminated either actively by the sensor or only by ambient light in the reading process.

42. A method in accordance with claim 22, wherein the indicator having a time-sensitive and/or temperature-sensitive substance activatable via light is a chemical indicator.

* * * * *